United States Patent
Seksaria et al.

[11] Patent Number: 5,944,373
[45] Date of Patent: Aug. 31, 1999

[54] LIGHTWEIGHT TAILGATE ASSEMBLY

[75] Inventors: Dinesh C. Seksaria, Novi; Romeo C. Pascasio, Rochester Hills, both of Mich.; John W. Cobes, Lower Burrell, Pa.

[73] Assignee: Aluminum Company Of America, Pittsburgh, Pa.

[21] Appl. No.: 09/136,098

[22] Filed: Aug. 18, 1998

[51] Int. Cl.⁶ .................................................. B60J 9/00
[52] U.S. Cl. .................. 296/57.1; 296/146.5; 296/146.6; 296/146.8; 296/901; 296/50; 49/501
[58] Field of Search ............................ 296/57.1, 50, 51, 296/901, 106, 146.5, 146.6, 146.8; 49/501; 52/784.1, 785.12, 743.11

[56] References Cited

U.S. PATENT DOCUMENTS

| | | | |
|---|---|---|---|
| 2,959,448 | 11/1960 | Bogater et al. | 296/106 |
| 3,700,076 | 10/1972 | Forsting et al. | 296/146.6 |
| 4,201,411 | 5/1980 | Morgan | 296/50 |
| 4,306,381 | 12/1981 | Presto | 296/146.5 |
| 4,529,244 | 7/1985 | Zaydel | 296/146.5 |
| 4,598,008 | 7/1986 | Vogt et al. | 296/901 |
| 4,769,951 | 9/1988 | Kaaden | 296/146.6 |
| 4,786,100 | 11/1988 | Kleemann et al. | 296/146.6 |
| 4,861,093 | 8/1989 | Chapman | 296/180.1 |
| 4,939,828 | 7/1990 | Maier | 29/897.2 |
| 5,215,346 | 6/1993 | Reitzloff | 296/51 |
| 5,328,225 | 7/1994 | Melching et al. | 296/26 |
| 5,425,564 | 6/1995 | Thayer | 296/61 |
| 5,536,060 | 7/1996 | Rashid et al. | 296/146.5 |
| 5,660,427 | 8/1997 | Freeman et al. | 296/901 |
| 5,678,876 | 10/1997 | Sargent et al. | 296/52 |
| 5,857,732 | 1/1999 | Ritchie | 296/146.5 |

FOREIGN PATENT DOCUMENTS

| | | | |
|---|---|---|---|
| 0142435 | 5/1985 | European Pat. Off. | 296/901 |
| 1280066 | 10/1968 | Germany | 296/901 |

*Primary Examiner*—Joseph D. Pape
*Assistant Examiner*—Kiran Patel
*Attorney, Agent, or Firm*—Glenn E. Klepac

[57] ABSTRACT

A lightweight tailgate assembly for pickup trucks includes several metal panels that are preferably made from a single metal sheet, a plastic reinforcing module between inner and outer metal panels, and fastener means joining the reinforcing module to the inner panel. A preferred assembly also includes hinge means for connection with truck body, and latch means for locking the assembly between opposed rear corner posts in a truck body. A particularly preferred tailgate assembly made with AA 6022 aluminum alloy sheet and a reinforcing module containing nylon and glass fibers weighs about half as much as a conventional steel struck tailgate.

18 Claims, 7 Drawing Sheets

LIGHTWEIGHT TAILGATE ASSEMBLY

BACKGROUND OF THE INVENTION

1. Field of the Invention

The present invention relates to body panels suitable for use on motor vehicles, and more particularly to a tailgate for pickup trucks.

2. Discussion of Related Art

A tailgate as presently used in pickup trucks is a relatively heavy assembly, weighing about 50 pounds. The assembly is made from a number of stamped steel sheets that are joined together by resistance spot welding. Steel reinforcements are welded to the sheets, adding strength and rigidity at critical locations.

Pickup trucks are hard working vehicles wherein the tailgate is expected to perform reliably for many years. Pickup truck buyers demand that these closure panels be strong, reliable, and look good. Tailgates are expected to withstand people or heavy loads standing on them in an open position, as well as loads placed on a top edge when they are closed. They are also used to tie down payloads carried in the truck bed.

The tailgate needs to be as light as possible because many pickup truck users are small in stature. It is also desirable to reduce tailgate weight so that the truck's payload can be increased without sacrificing fuel economy. The presently available tailgates are heavy because they are made from steel. In addition, because they are assembled from many components, they are not as reliable, strong, or durable as desired. These steel panels are also subject to attack by moisture, road salt, and other chemical agents in the environment that are corrosive to steel and eventually detract from its structural integrity and appearance. Accordingly, there still remains a need to provide a lightweight, strong, durable panel for pickup truck tailgates that has minimal impact upon vehicle cost. It is also desirable to reduce tailgate weight in order to improve fuel efficiency and truck payload capacity.

In recent years, some vehicle body panels have been made from thermoplastic polymers. Such panels are lighter than steel. However, they generally provide reduced strength and rigidity compared with steel panels.

Some issued patents disclosing pickup truck tailgates include U.S. Pat. Nos. 4,861,093; 4,939,828; 5,328,225; 5,425,564; and 5,678,876. Although prior art pickup truck tailgates generally perform adequately, tailgates made from steel sheets detract from fuel economy and are cumbersome to lift manually because of their large weight. Accordingly, there still remains a need to provide a tailgate for pickup trucks that is light, has adequate strength and rigidity, and is an economical replacement for steel.

A principal objective of the present invention is to provide a tailgate assembly suitable for pickup trucks that is lighter than conventional tailgates made from sheet steel.

A related objective of the invention is to provide a tailgate assembly made from aluminum alloy and plastic components.

A further objective of our invention is to provide a tailgate assembly that can be manufactured economically.

These and other objectives and advantages of our invention will become readily apparent to persons skilled in the art from the following description of a particularly preferred embodiment.

SUMMARY OF THE INVENTION

In accordance with the present invention, there is provided a lightweight tailgate assembly for pickup trucks. The tailgate assembly includes inner and outer metal panels, a plastic reinforcing module between the inner and outer panels, and fastener means joining the reinforcing module to the inner panel.

The metal panels may be made from aluminum or magnesium and preferably comprise an aluminum alloy of the AA 2000, 5000, 6000 or 7000 series. Aluminum alloys of the AA6000 series, comprising aluminum alloyed with magnesium and silicon, are particularly preferred. The metal panels are preferably made from a single sheet, stamped and folded into a desired configuration.

The tailgate assembly preferably includes top and bottom metal panels extending between the inner and outer panels, and a pair of opposed side panels extending between the top and bottom panels alongside the inner and outer panels. The top and bottom panels are preferably generally parallel to each other. The inner and outer panels are also generally parallel.

The reinforcing module comprises a thermoplastic resin, preferably nylon reinforced with glass fibers. Other suitable thermoplastics include polyolefins such as polypropylene and ethylene-propylene copolymers, polyvinyl chloride, polycarbonates, polyurethanes, and mixtures thereof.

The reinforcing module adds stiffness, strength and dent resistance to the tailgate assembly.

The reinforcing module includes a main leg extending between side legs adjacent the side panels; a top leg adjacent the top panel; a plurality of support legs connecting the main leg and the top leg; and two bottom legs extending downwardly from the main leg.

The fastener means may include metal screws or bolts and is preferably a plurality of metal screws extending through the metal inner panel into the reinforcing module. If desired, the reinforcing module can be connected with the metal outer panel by an adhesive.

In a preferred embodiment the tailgate assembly includes hinge means for connecting the assembly to a truck body. A preferred hinge means includes metal collars attached to the side panels and extending laterally outwardly. The metal collars mate with metal hinge pillars attached to rear corner posts on the truck body.

The tailgate assembly also preferably includes a latch means or latch assembly for locking the assembly between opposed rear corner posts in a truck body. The latch means includes a base plate attached to the inner panel; a handle supported by the base plate and extending through an opening in the outer panel; and connecting rods extending laterally outwardly from the handle and connecting with the rear corner posts.

DETAILED DESCRIPTION OF PREFERRED EMBODIMENTS

Figure 1:
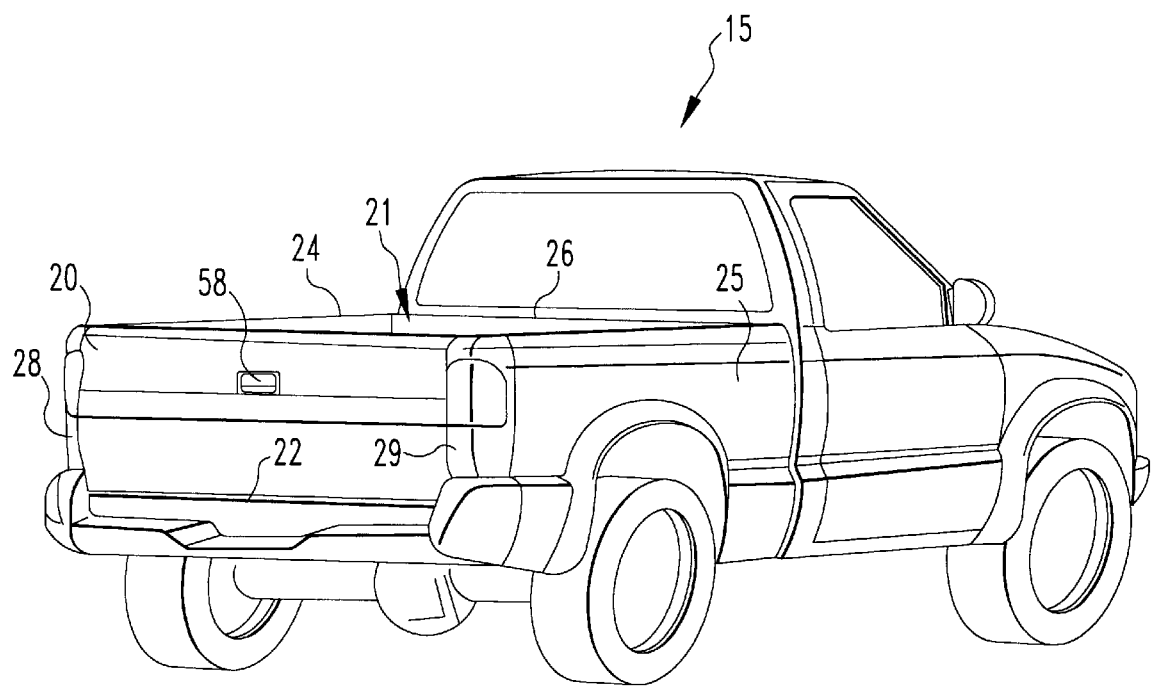
FIG. 1 is a perspective view of a pickup truck showing a tailgate assembly made in accordance with the present invention.

A pickup truck 15 having a tailgate or tailgate assembly 20 made in accordance with the present invention is shown in FIG. 1. The truck 15 has a truck bed 21 defined by a bed floor 22, the tailgate 20, bed side walls 24, 25, and a bed front wall 26. Rear corner posts 28, 29 behind the side walls 24, 25 support hinge pillars (not shown) for the tailgate 20.

Figure 2:
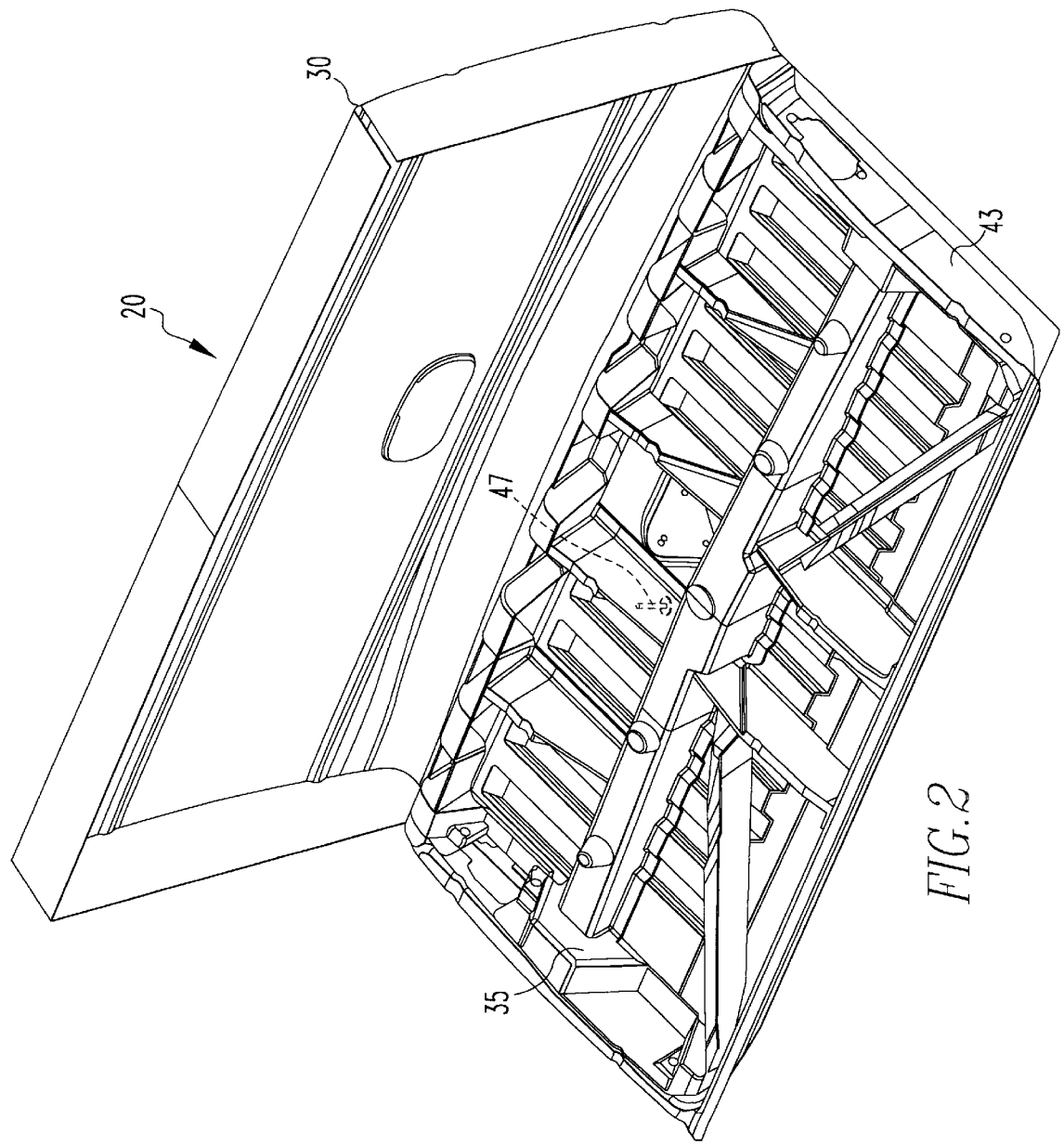
FIGS. 2 and 5 are perspective views of a tailgate assembly of the present invention.
Figure 3:
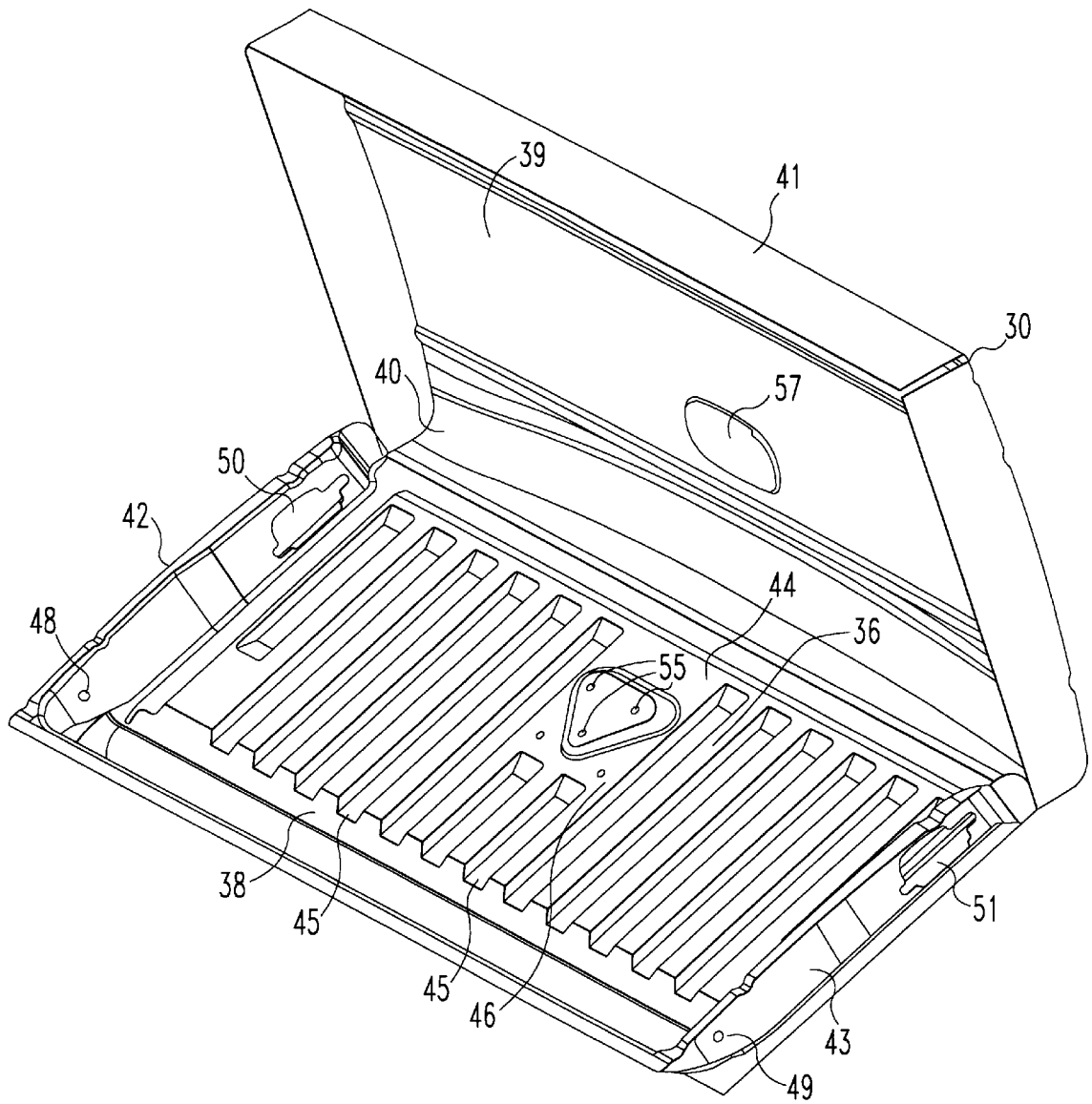
FIG. 3 is a perspective view of a metal sheet deformed into several metal panels.
Figure 4:
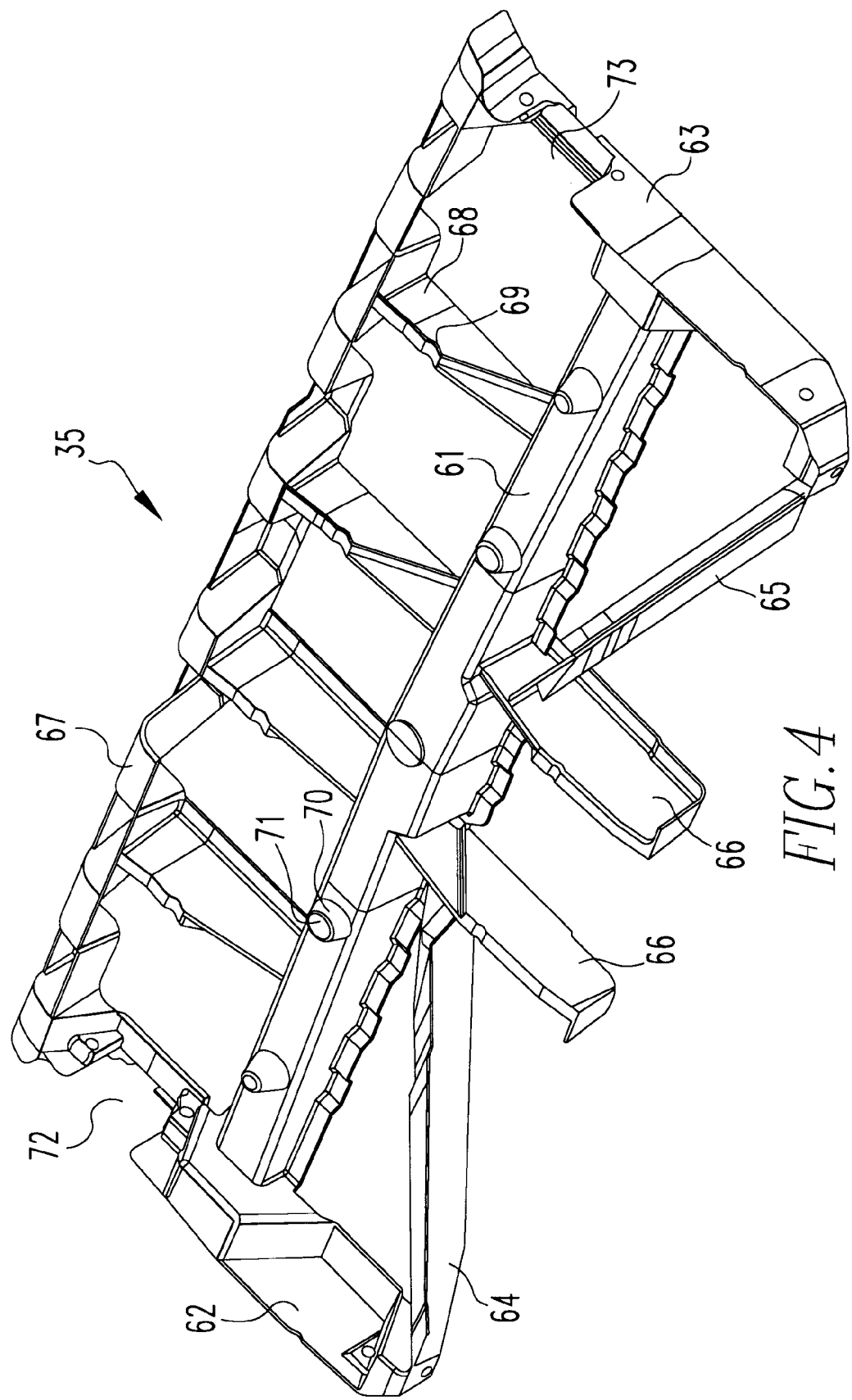
FIG. 4 is a perspective view of a plastic reinforcing module of the invention.

As shown in FIGS. 2–4, the tailgate 20 includes a single metal sheet 30 deformed into several metal panels, and a plastic reinforcement or reinforcing module 35 contained within a compartment 36 defined by the metal panels. The metal sheet 30 preferably comprises an AA 6022 aluminum alloy in the T4 temper and may have a gauge of about 1.0–1.25 mm. A particularly preferred sheet 30 has a gauge of about 1.2 mm.

As shown in FIG. 3, the metal sheet 30 includes an inner panel 38, an outer panel 39, a top panel 40, a bottom panel 41, and side panels 42, 43. The inner panel 38 is deformed so that it includes a generally planar principal surface 44 and several vertical ribs 45 extending inwardly from the principal surface 44.

The principal surface 45 defines fastener openings 46 for metal screws or bolts interconnecting the inner panel 38 to the module 35. One metal screw 47 is shown in FIG. 2.

The side panels 42, 43 each define a small opening 48, 49 for bolting a hinge collar or tailgate pivot (not shown) onto the tailgate. The side panels 42, 43 also include larger openings 50, 51 for a latch mechanism (not shown). Three bolts (not shown) extending through holes 55 join the latch mechanism to the inner panel 38. The outer panel 39 includes a large opening 57 for the latch handle 58 (shown in FIG. 1).

As shown in FIGS. 2 and 4, the plastic reinforcing module 35 is a one-piece molding of nylon reinforced with glass fibers. Other suitable thermoplastic resins for the module 35 include polyolefins such as polypropylene and ethylene, propylene copolymers, polyvinyl chloride, polycarbonates, polyurethanes, and mixtures of these polymers.

The module 35 includes a main leg 61 extending laterally between two side legs 62, 63 adjacent the side panels 42, 43. The side legs 62, 63 each define a large orifice 72, 73 aligned with an opening 50, 51 in a side panel 42, 43 of the metal sheet 30. Two Z-stiffeners or bottom legs 64, 65 extend diagonally downwardly from the main leg 61 into bottom corners of the compartment 36 adjacent bottom ends of the side panels 42, 43. The two inner legs 66 extend downwardly from upper portions of the bottom legs 64, 65. Bottom portions of the inner legs 66 abut against the bottom panel 41. A top leg 67 adjacent the top panel 40 extends between top portions of the side legs 62, 63. Four vertically extending support legs 68 connect the main leg 61 with the top leg 67. The support legs 68 each include a small groove 69 accommodating one of the metal rods in the latch mechanism.

As shown in FIGS. 2 and 4, the main leg 61 includes several outwardly extending truncated cones 70. In a preferred embodiment, an adhesive 71 is applied to outer portions of the cones 70. A foamed polyurethane adhesive is particularly preferred. The adhesive 71 joins the reinforcing module 35 to the metal outer panel 39.

Figure 5:
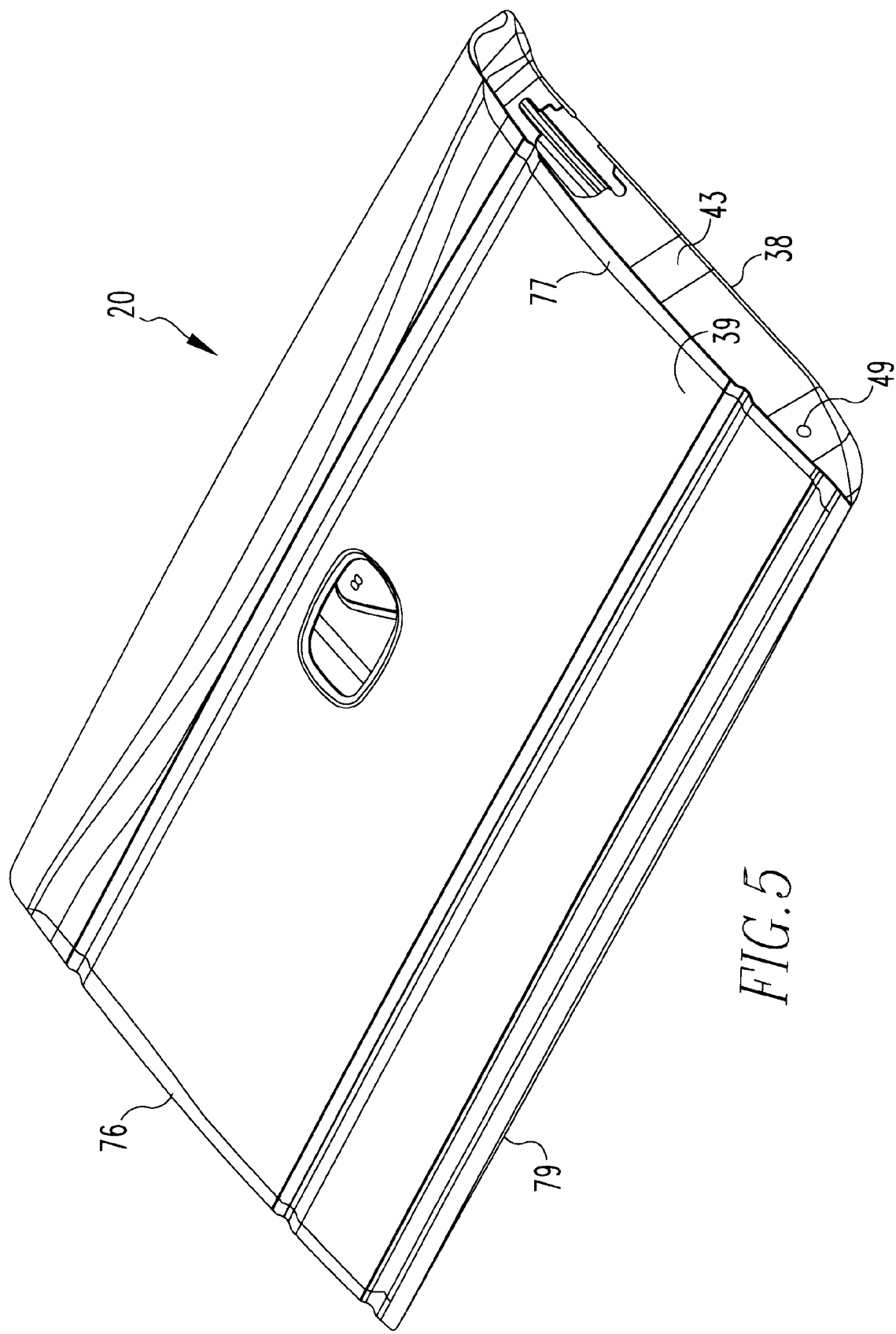

As shown in FIG. 5, the side panels are joined to the outer panel 39 by side hems 76, 77. The inner panel 38 is joined to the bottom panel 41 by a bottom hem 79. The hems 76, 77, 79 are made by overlapping edge portions of the metal panels and then folding and compressing the edge portions together so that they remain permanently attached.

Figure 6:
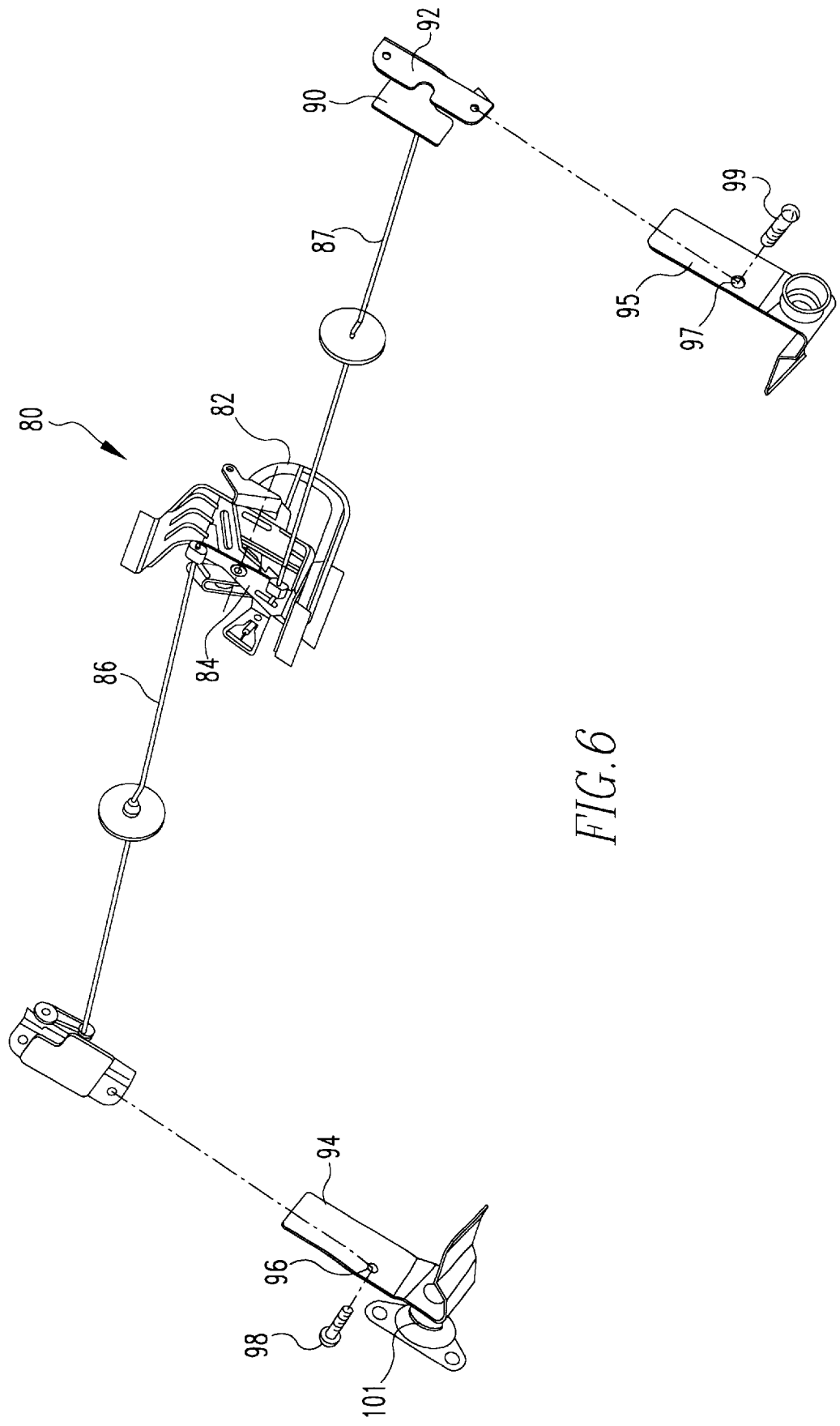
FIG. 6 is an exploded, fragmentary view, showing the latch mechanism and tailgate hinges of the invention.

A latch mechanism 80 for locking the tailgate assembly between two rear corner posts is shown in FIG. 6. The latch mechanism 80 includes a base plate 82 that is secured to the inner panel, a lever arm 84 pivoted on the base plate 892, and metal rods 86, 87 extending from opposed ends of the lever arm 84. A metal lock 90 attached to the right rod 87 interacts with a metal plate 92 affixed to the right rear corner post to lock the tailgate assembly in place.

The tailgate assembly connects with two rear corner posts 28, 29 on a truck body by a hinge means comprising two metal hinge collars 94, 95 secured to opposite side panels of the assembly. The hinge collars 94, 95 each include a metal plate defining an aperture 96, 97 for bolts 98, 99 extending through openings 48, 49 in the side panels 42, 43 and anchored in the reinforcing module. The hinge collars 94, 95 each engage with a hinge pillar or hinge pin 101 affixed to one of the truck corner posts 28, 29.

Figure 7:
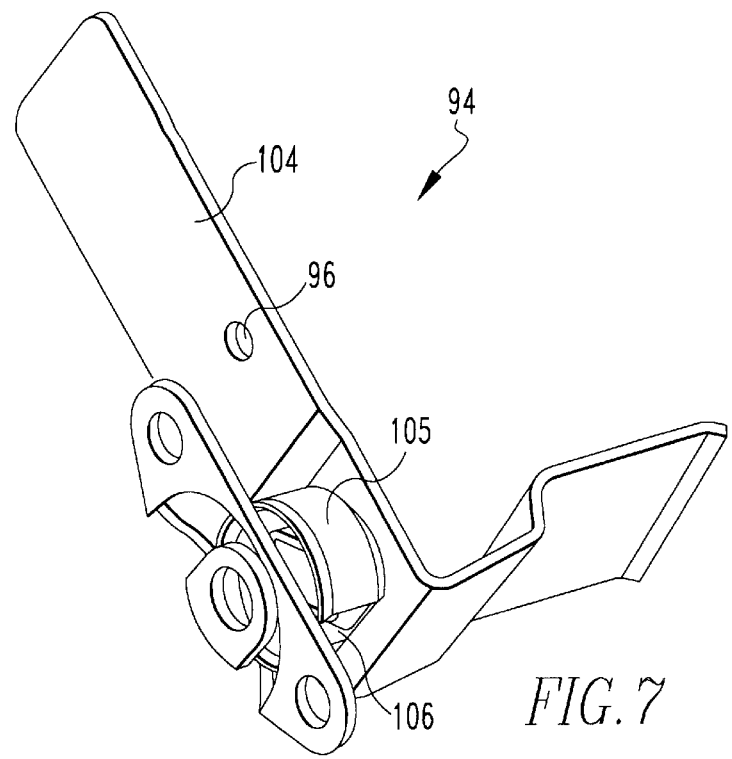
FIGS. 7 and 8 are enlarged views of the tailgate hinges of FIG. 6.
Figure 8:
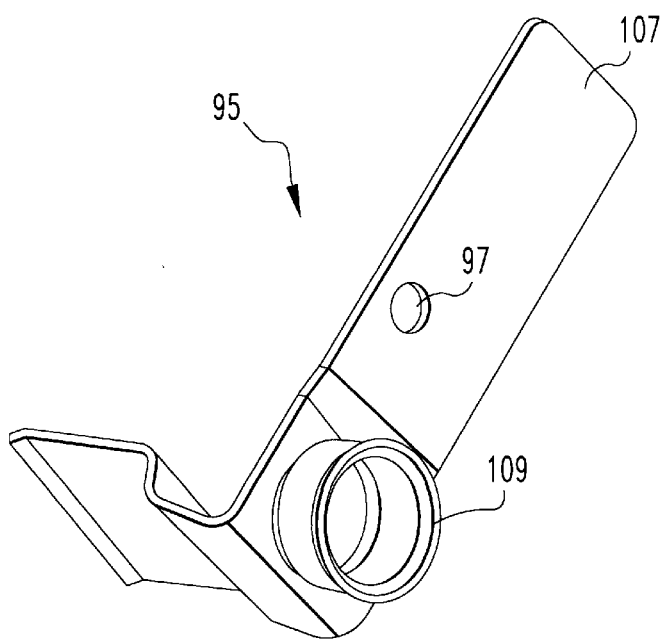

The hinge collars 94, 95 are shown in greater detail in FIGS. 7 and 8. The left hinge collar 94 includes a metal plate 104 defining an aperture 96. A metal collar 105 attached to the plate 104 includes a slot 106 that enables the truck owner to detach the hinge collar 94 from the left corner post when the tailgate assembly is tilted rearwardly at a 45° angle.

The right hinge collar 95 includes a metal plate 107 defining an aperture 97 for a bolt. The hinge collar 95 also includes an uninterrupted metal collar 109 attached to the plate 107, and extending laterally outwardly. The metal collar 109 defines an opening for the right hinge pin attached to the right corner post (not shown).

Having described the presently preferred embodiments, it is to be understood that the invention may be otherwise embodied within the spirit and scope of the appended claims.

What is claimed is:

1. A lightweight tailgate assembly for trucks, comprising:
   (a) an inner panel, an outer panel spaced from said inner panel, and top and bottom panels extending between said inner and outer panels, said inner and outer panels being integrally formed from a single, aluminum alloy sheet;
   (b) a plastic reinforcing module between said inner and outer panels, said module including a top leg adjacent said top panel and at least one bottom leg adjacent said bottom panel; and
   (c) fastener means joining said module to said inner panel.

2. The tailgate assembly of claim 1 wherein said inner, outer, top and bottom panels comprise a single aluminum alloy sheet.

3. The tailgate assembly of claim 2 wherein said aluminum alloy sheet further comprises a pair of opposed, generally parallel side panels extending between said top and bottom panels.

4. The tailgate assembly of claim 2 wherein said inner and outer panels are generally parallel.

5. The tailgate assembly of claim 2 wherein said aluminum alloy sheet comprises an aluminum alloy of the AA2000, 5000, 6000 or 7000 series.

6. The tailgate assembly of claim 1 wherein said module comprises a thermoplastic resin selected from nylon, polyolefins, polyvinyl chloride, polycarbonates, polyurethanes, and mixtures thereof.

7. The tailgate assembly of claim 6 wherein said module further comprises glass reinforcing fibers.

8. The tailgate assembly of claim 3 wherein said module further comprises opposed end legs adjacent said end panels.

9. The tailgate assembly of claim 3 wherein said module includes a pair of bottom legs extending diagonally into opposed bottom corners of said assembly.

10. The tailgate assembly of claim 1 further comprising:
(d) hinge means for connecting said assembly to a truck body.

11. The tailgate assembly of claim 10 wherein said hinge means comprises a collar extending laterally outwardly of said aluminum alloy sheet.

12. The tailgate assembly of claim 1 further comprising:
(e) latch means for locking said assembly between opposed rear corner posts in a truck body.

13. A lightweight tailgate assembly for trucks, comprising:
(a) an inner panel and an outer panel spaced from said inner panel, said inner and outer panels being integrally formed from a single, aluminum alloy sheet,
(b) a plastic reinforcing module between said inner and outer panels, said module comprising a thermoplastic resin reinforced with glass fibers,
(c) fastener means joining said module to said inner panel, and
(d) hinge means for connecting said tailgate assembly to opposed rear corner posts in a truck body.

14. The tailgate assembly of claim 13 further comprising opposed side panels extending between said top and bottom panels.

15. The tailgate assembly of claim 14 wherein said hinge means comprises opposed hinge collars extending laterally outwardly of said side panels.

16. The tailgate assembly of claim 13, further comprising:
(e) latch means for locking said assembly between opposed rear corner posts in a truck body.

17. The tailgate assembly of claim 16 wherein said latch means includes at least one metal rod extending through an orifice defined by said reinforcing module and an opening defined by said aluminum alloy sheet.

18. The tailgate assembly of claim 16 wherein said latch means includes at least one metal rod supported by at least one groove in said reinforcing module.

* * * * *